July 6, 1954

M. M. LEVY 2,683,191

PULSE SIGNALING SYSTEM

Filed Aug. 10, 1949

2 Sheets-Sheet 1

INVENTOR
Maurice Moise Levy

BY
Alfons Kuschstein [signature]
ATTORNEY

July 6, 1954

M. M. LEVY 2,683,191

PULSE SIGNALING SYSTEM

Filed Aug. 10, 1949

2 Sheets-Sheet 2

INVENTOR
MAURICE MOISE LEVY
BY [signature]
ATTORNEY

Patented July 6, 1954

2,683,191

UNITED STATES PATENT OFFICE 2,683,191

PULSE SIGNALING SYSTEM

Maurice Moïse Levy, London, England, assignor to The General Electric Company, Limited, London, England Application August 10, 1949, Serial No. 109,450

Claims priority, application Great Britain August 11, 1948

4 Claims. (Cl. 179—15)

The present invention relates to pulse signalling systems employing pulses having a duration small in comparison with the time period of their recurrence. An example is a multi-channel pulse signalling system in which the recurrent pulses of different channels are interlaced in time with one another.

One of the objects of the invention is to provide improved means for effectively increasing the energy content of such pulses after reception.

A further object of the invention is to provide a receiver for modulated pulses in which the low-pass filter or like device used to extract the modulation from the pulses can be of simplified construction.

According to the present invention there is provided a method of effectively increasing the energy of recurrent received modulated pulses, the pulses as received having a duration small in comparison with the time period of their recurrence, which method comprises increasing (in the receiver) the effective duration of each amplitude or width-modulated pulse to substantially the whole, or at least a large fraction, of the time period of recurrence of the pulses. If the pulses are not initially amplitude or width-modulated, the method of the invention includes the preliminary or simultaneous step of converting their modulation to amplitude or width-modulation.

The present invention also provides apparatus for carrying out the method set forth.

Figure 1:
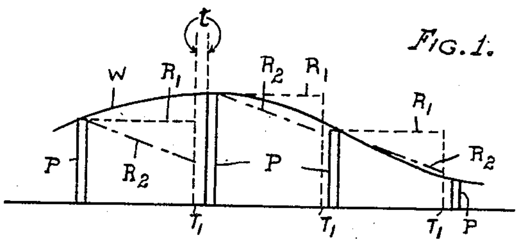
Figure 5:
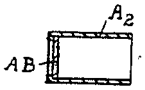
Figure 2:
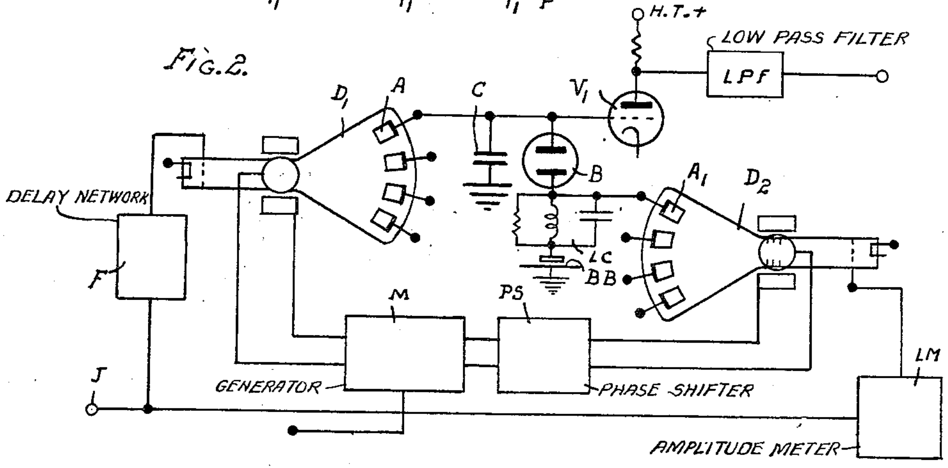
Figure 3:
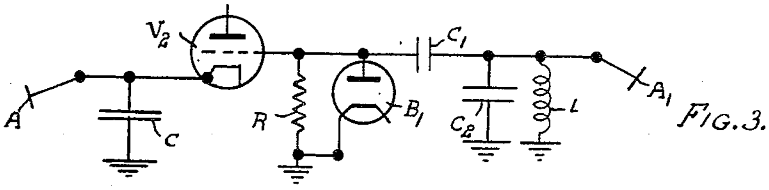
Figures 4, 6:
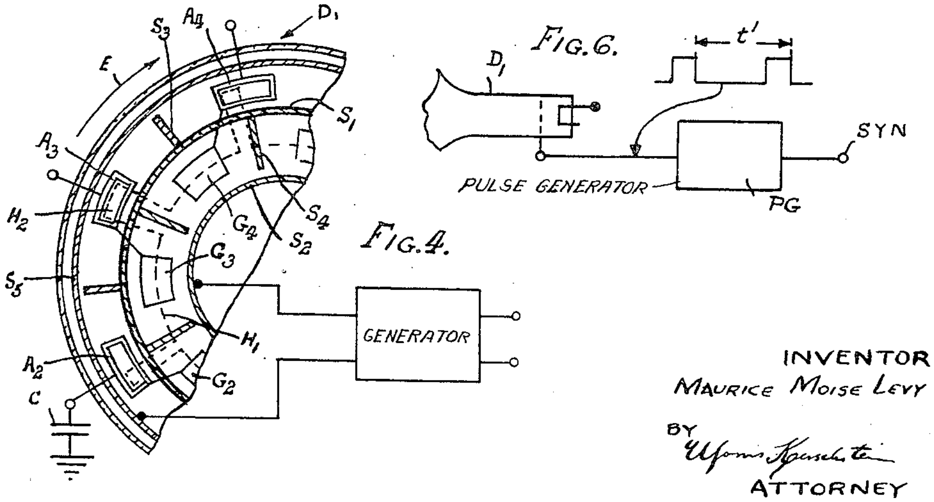
Figure 7:
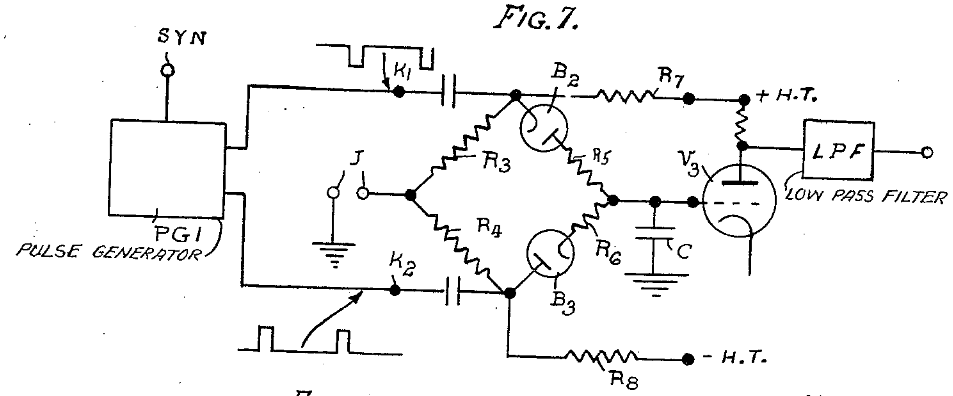
Figure 8:
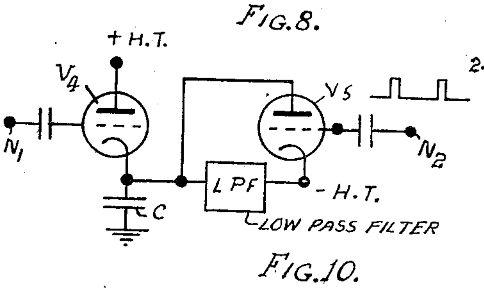
Figure 9:
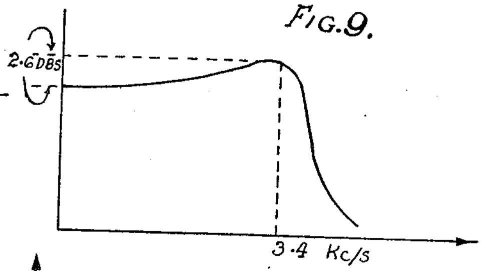
Figures 10, 12:
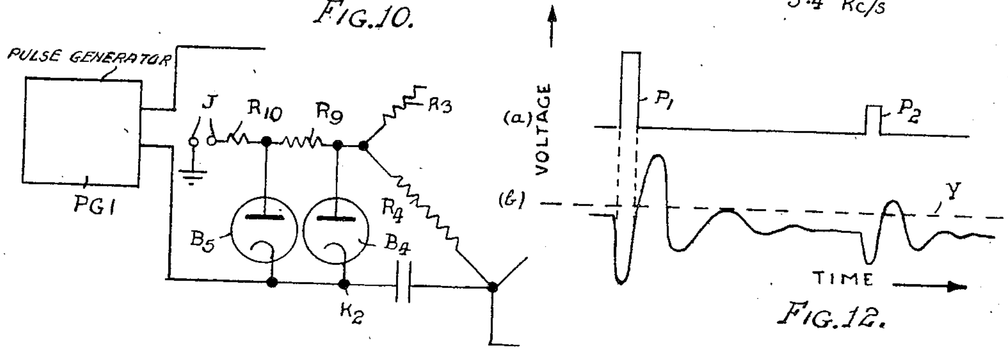
Figure 11:
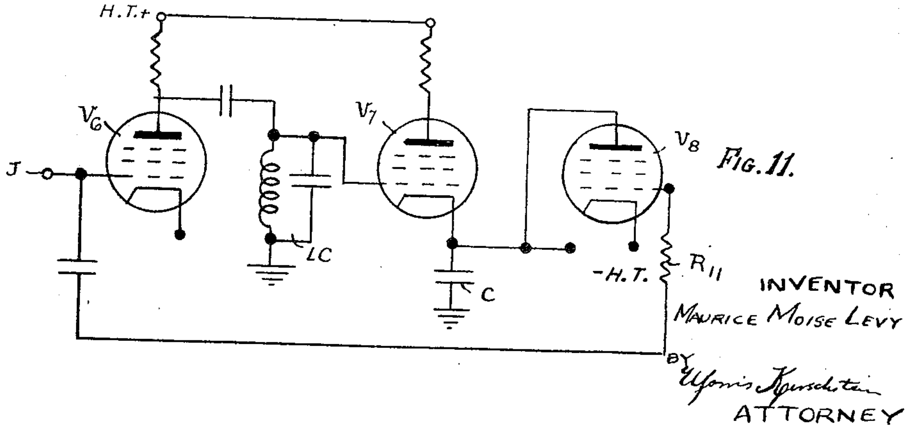

The invention will be described with reference to the accompanying drawing in which Figure 1 is an explanatory diagram, Figure 2 is a circuit diagram illustrating one embodiment of the invention, Figure 3 illustrates a modification of the circuit of Figure 2, Figure 4 is a part of an end view in section of a cathode ray tube which may be employed in another embodiment of the invention, Figure 5 shows a view in sectional elevation of one of the buckets used in Figure 4, Figure 6 shows how the tube in Figure 4 may be controlled, Figures 7 and 8 show further circuits according to the invention and Figure 9 is a diagram representing the response of a low-pass filter which may be employed for extracting the modulation from the signals, Figure 10 shows a modification of part of Figure 7, Figure 11 is a circuit diagram of a further embodiment of the invention and Figure 12 is an explanatory diagram.

Referring to Figure 1, this shows a diagram of voltage plotted as ordinate against time as abscissa, representing a train of pulses P, amplitude-modulated in accordance with a wave-form W. The energy content of pulses is proportional to the area enclosed by them. In the case of multi-channel systems in which a large number of channels are employed, it is evident that the width of individual pulses must be made very small and their energy content must be correspondingly small. Each pulse has an amplitude which represents the instantaneous amplitude of the waveform W. If each pulse could be given a waveform such as is shown at $R_1$ where the amplitude of the pulse is maintained for substantially the whole time period between pulses, it is evident that the energy content of the pulses would be greatly increased. Even if the pulses were converted to the form indicated by the waveform $R_2$, the energy content would be greatly increased. The main feature of the present invention is therefore seen from Figure 1 to be to increase the duration of the pulses to nearly the whole of the period between successive pulses of a channel. In some cases the period may be increased to the whole of this period.

Referring to Figure 2, there is shown a cathode ray distributor $D_1$ of known type having a number of anodes A arranged, usually in a ring, so as to be swept over consecutively by a cathode ray beam sweeping out a conical path. The anodes may be in the form of plates but preferably as shown they are in the form of buckets. Each of the anodes is connected to a circuit of which only the one connected to the uppermost anode is shown in the figure. This comprises a capacitance C which is usually the inherent capacitance of the anode to earth, a rectifier B, the anode of which is connected to an anode $A_1$ of a second distributor $D_2$ having the same number of anodes as the distributor $D_1$ and having its cathode ray beam rotating in step with that of the distributor $D_1$ but phase-displaced relatively thereto as will be explained later. The anode of the rectifier B is connected through a damped tuned circuit LC and a bias source BB to earth. Multi-channel amplitude-modulated pulse signals are applied in known manner at terminal J to control the intensity of the beam in the tube $D_1$, pulses corresponding to a different channel being generated at each of the anodes A. A delay network F may be included between the terminal J and the control electrode of the tube $D_1$ for a reason to be explained later. The pulses at the uppermost anode which may have the form shown at P in Figure 1 each in turn serve to apply a charge to the capacitance C. When the first pulse arrives, it makes the upper terminal of the capacitance C negative but the rectifier B remains non-conducting because of the bias from the source BB. The charge is therefore held upon the capacitance with only a slight loss due to any inherent leakage in the circuit. The voltage so maintained across the capacitance C is substantially proportional to the amplitude of the pulse by which the voltage is produced and hence to the instantaneous amplitude of the modulation.

The beams in the two tubes $D_1$ and $D_2$ are caused to rotate by oscillations from a generator M applied to deflecting means of the two tubes, phase shifting means PS being provided for adjusting the relative phases of the two beams. The relative phasing of the beams in the distributors $D_1$ and $D_2$ is arranged to be such that at the instant $T_1$ in Figure 1 the beam in the tube $D_2$ is falling upon the top anode $A_1$. The intensity of the beam in the distributor $D_2$ is controlled by short pulses occurring at the instants $T_1$. These pulses may be derived from the terminal J and thus from the channel pulses P but are preferably of constant amplitude for which purpose an amplitude limiter LM may be included. The delay network F is arranged to introduce a delay of $t$ (see Figure 1).

The effect of such a pulse generated at the upper anode $A_1$ is to shock-excite the circuit LC and the first positive peak of the wave of shock-excitation serves to discharge the capacitance C quickly to a datum level. This capacitance C is then ready to receive a new charge corresponding to the next pulse of the same channel. Owing to the time delay $t$, each pulse P first serves to discharge the capacitance C through the distributor $D_2$ and at a time $t$ later charges the capacitance C through the distributor $D_1$. The voltage across the capacitance C which is in the form of pulses of increased duration is applied to the control grid of a valve $V_1$ and thence to a low-pass filter LPF by which the modulation may be extracted.

With the particular circuit shown in Figure 2, the amount of secondary emission from the anodes A and $A_1$ must be less than the primary emission. It is therefore desirable for this particular circuit that the anodes should, as shown, be in the form of buckets rather than plates.

It is not necessary that the pulses applied to control the intensity of the beam in the distributor $D_1$ should be amplitude-modulated. If they are width-modulated the arrangement will operate automatically to convert the pulses effectively into amplitude-modulated pulses, since the voltage on the condenser C will be dependent upon the number of electrons collected and hence upon the duration of the pulse. If the pulses are time-modulated the distributor may be arranged in known manner to convert these pulses to amplitude-modulation.

In a modification of Figure 2, the delay network F and limiter LM are omitted. The beam in the tube $D_2$ remains switched on and as the beam rotates negative pulses are generated at the anodes $A_1$ etc. The phasing of the tubes $D_1$ and $D_2$ is made such that the pulse at $A_1$ occurs just before the pulse at A. If the anodes $A_1$ etc. are made in the form of plates of suitable material instead of buckets, relatively large secondary emission can be arranged to occur at these anodes whereby the pulses generated are positive. The circuit LC can then be replaced by a resistor alone.

In the modified arrangement of Figure 3, the parts which correspond with those in Figure 2 are given the same references. In this case the anode A is connected to the cathode of a triode $V_2$. The control grid of the valve $V_2$ is connected through a condenser $C_1$ to the anode $A_1$ which is connected to earth through an inductor L. The control grid of the valve $V_2$ is connected to earth through a circuit comprising a resistor R and a diode $B_1$ connected in parallel. The circuit $B_1R$ acts as a self-biasing circuit to maintain a predetermined, suitable negative voltage upon the control grid of the valve $V_2$. It is arranged that when the capacitance C is charged negatively upon arrival of a pulse, this negative charge is insufficient to render the valve $V_2$ conducting. When, at the instants $T_1$ of Figure 1, short pulses arrive at the anode $A_1$, the tuned circuit constituted by the inductance L and stray capacitance $C_2$ is shock-excited and the voltage on the right-hand plate of the condenser $C_1$ has the form of a negative excursion followed by a positive excursion and a damped train of oscillations. The negative excursion has no effect upon the valve $V_2$ but it is arranged that the positive excursion renders the valve $V_2$ conducting and so discharges the capacitance C and also raises the potential of the anode of the diode $B_1$ just above earth potential, the current thus caused to flow in the diode serving to recharge the capacitance $C_1$. In this way the required negative bias is maintained upon the control grid of the valve $V_2$.

Other circuits which have been proposed for converting constant amplitude time-modulated pulses to constant amplitude width-modulated pulses may be adapted to the requirements of the present invention.

Referring to Figure 4, the cathode ray tube $D_1$ has anodes $A_2$, $A_3$, $A_4$ etc. in the form of buckets arranged in an outer ring and in a ring within the anode plates $G_2$, $G_3$, $G_4$ etc. connected electrically to anodes $A_2$, $A_3$, $A_4$ etc. respectively. The base AB of the buckets may as shown in Fig. 5 be of transparent material such as mica to facilitate monitoring. Width-modulated pulses are applied, for instance in the manner described in the specification of co-pending British Patent No. 652,400, April 25, 1951, to deflect cathode ray beam between an inner path indicated by the broken line $H_1$ and an outer path indicated by $H_2$, the beam being assumed to rotate in the direction of the arrow E. As in the arrangement already described, each of the anodes is arranged to co-operate with a different channel. The cathode ray beam impinges upon an anode for a time dependent upon the instantaneous width of the pulse, and hence upon the modulation of the pulse, and the current collected by the anode has therefore an amplitude dependent upon this modulation. The self-capacitance of the anode, or a capacitance in shunt, is thus charged at each impact of the cathode ray beam thereupon to a potential dependent upon the instantaneous value of the modulation in the channel to which the anode belongs. The plates $G_2$, $G_3$ etc. serve, instead of the other arrangements so far described, to discharge this capacitance at suitable instants such as $T_1$ in Figure 1. If desired these plates can be placed behind a mask having a slot opposite to each plate, the electron beam reaching the plates through the mask. The mask may be connected to a point of suitable fixed potential. Thus, after the beam has struck the anode $A_4$ and has charged its capacitance to a voltage corresponding to the instantaneous value of the modulation, it sweeps over the anodes $A_5$ etc.

(not shown) along the broken line paths $H_1$, $H_2$ until it reaches a plate $G_4$. It is arranged that the secondary emission from the plates $G_2$, $G_3$ etc. exceeds the primary electron current falling upon the plates and the effect of the beam falling upon the plate $G_4$ which is connected to the anode $A_4$ is thus to discharge this anode at a moment just before the anode $A_4$ is to receive its next charge.

In order to ensure discharge of the anodes the plates $G_2$, $G_3$ etc. may be made of material having relatively high secondary emission characteristics, and it may be arranged that the intensity of the beam is increased during the intervals whilst the beam is upon the plates $G_2$, $G_3$ etc. in comparison with its value at other times. This may be done as shown in Figure 6 by applying a voltage of suitable waveform from a pulse generator PG to the cathode or control grid of the cathode ray tube $D_1$. The pulse voltage may be generated by the generator PG under the control of received synchronising signals applied at SYN. The pulses have a recurrence period $t'$ equal to that of the received modulated pulses, when these pulses are not modulated.

Circumferential screens such as $S_1$ and $S_2$ may be provided together with radial screens $S_3$ and $S_4$. The screen $S_2$ is shown insulated from the other screens in order that it may also constitute the inner deflecting electrode by which the radius of rotation of the beam is changed. The outer deflecting electrode is shown at $S_5$. A further collecting electrode may be added to collect the secondary emission of the plates $G_2$, $G_3$ etc. If desired, it may be arranged that the beam is suppressed or substantially suppressed during its passage from the track $H_1$ to the track $H_2$. This also may be achieved by the application of voltage of suitable waveform to the cathode or control electrode.

The arrangement of Figure 7 is adapted to extend the duration of pulses over the full recurrence period. This arrangement comprises a bridge circuit having two arms containing resistors $R_3$ and $R_4$, a third arm containing a diode $B_2$ in series with a resistor $R_5$ and a fourth arm containing a diode $B_3$ in series with a resistor $R_6$. The cathode of the diode $B_2$ is connected through a resistor $R_7$ to a terminal +HT and the anode of the diode $B_3$ is connected through a resistor $R_8$ to a terminal −HT. A suitable source of voltage is applied between the terminals +HT and −HT. The junction of resistors $R_5$ and $R_6$ is connected to the control grid of a valve $V_3$, the self-capacitance of this grid circuit to earth together with any additional capacitance which it may be found desirable to add effectively in parallel with the self-capacitance, being indicated by the capacitance C. The valve $V_3$ has its anode circuit connected to a low-pass filter LPF. The cathode of the diode $B_2$ is connected through a condenser to a terminal $K_1$ and the anode of the diode $B_3$ is connected through another condenser to the terminal $K_2$. Signals which may be multi-channel pulse signals are applied between terminals J. Gating pulses of the channel pulse recurrence frequency and of the form indicated are generated in a generator PG1 under the control of synchronising signals applied at SYN and are applied to the terminals $K_1$ and $K_2$, these pulses occurring at the same instants of time, but being in opposite sense. The arrangement is such that in the absence of pulses at the terminals $K_1$ and $K_2$ the two diodes are held non-conducting by the voltage applied between terminals +HT and −HT, irrespective of whether pulses appear between the terminals J or not. The pulses applied to the terminal $K_1$ serve to render the cathode of the diode $B_2$ more negative, and those applied to the terminal $K_2$ serve to make the anode of the diode $B_3$ more positive and these pulses are arranged to be such that the two diodes are rendered conductive to pulses applied between terminals J whilst the pulses at $K_1$ and $K_2$ are present. The effect of the pulses at $K_1$ and $K_2$ is to cause the grid of the valve $V_3$ to assume the same potential as the right-hand terminal J, whether this potential is higher or lower than its value immediately before the appearance of the pulses on $K_1$ and $K_2$. The result is, therefore, that a pulse appearing between terminals J at the same instant as pulses appear on $K_1$ and $K_2$ charges the capacitance C to a voltage representative of the instantaneous amplitude of the pulse between the terminals J. The capacitance C maintains this charge with little loss until the next pulses arrive on $K_1$ and $K_2$ when its charge is changed to the new value appropriate to the new condition of modulation. The anode circuit of the valve $V_3$ is connected as before to a low-pass filter or the like.

It is to be noted that the pulses applied at $K_1$ and $K_2$ must be of such duration and phasing that they cease before the corresponding channel pulses applied at J. This is to prevent discharge of the capacitance C. The diodes $B_2$ and $B_3$ and other diodes may of course be replaced by dry rectifiers.

In the arrangement of Figure 8, modulated channel pulses are applied to a terminal $N_1$ and gating pulses of like phase but of constant amplitude, which may be generated as described with reference to Figure 7, are applied to a terminal $N_2$, both sets of pulses being in a positive sense, to cause current to flow in two valves $V_5$ and $V_4$ in series, and charge the condenser C to a voltage dependent upon the amplitude of the channel pulses. The effect of this circuit is substantially the same as that of the circuit in Figure 7. The voltage across the condenser C is applied to a low-pass filter LPF, preferably through a valve which is not shown.

With pulses such as those at P in Figure 1, there is a strong component at the pulse recurrence which may, for example, be 8 kc./s., and the low-pass filter LPF used for demodulation must be designed to remove this component. On the other hand the filter must be so designed that the highest modulation frequency which may for example be 3.4 kc./s., is passed with little attenuation. The low-pass filter for this purpose is relatively costly. If a circuit such as that of Figure 7 is used, however, so that the duration of pulses is increased to the whole period between successive channel pulses, in the absence of modulation there is no component at 8 kc./s. The curve representing amplitude of output against frequency proceeding from zero frequency upwards begins nearly horizontal indicating constancy of amplitude and falls thereafter progressively to zero at 8 kc./s. where it crosses zero line indicating a reversal of phase. When modulation is present some component of 8 kc./s. appears, but this is very small compared with its value with narrow pulses as in Figure 1 at P. Similarly when the pulses are arranged to extend nearly, but not quite, over the whole period between successive pulses, some component at 8 kc./s. is present, but again it is small. For these reasons, when the present invention is employed, the filter circuit used to extract the modulation frequency can be of relatively simple design, since the component of 8 kc./s. to be eliminated is of small magnitude.

It is to be noted that when using the circuit of Figure 7 or any other arrangement producing a like result, where in the absence of modulation there is no component at 8 kc./s., the fact that a certain small component at this frequency appears when modulation is present is not of great importance, since it is when modulation is at its lowest level that complete filtering of the 8 kc./s. component is most important.

In the case quoted where the highest modulation frequency is 3.4 kc./s. the amplitude of components at this highest frequency is found to be about 2.6 db below the amplitude at zero frequency. Accordingly the low pass filter should be designed in the manner indicated in Figure 9 to provide a gain of approximately 2.6 db at 3.4 kc./s. in comparison with the gain at zero frequency.

With the circuit of Figure 7, some signal voltage will reach the grid of the valve $V_3$ even in the absence of pulses at $K_1$ and $K_2$, and this may lead to cross-talk. In order substantially to avoid this objection, as shown in Figure 10, a resistor $R_9$ may be connected between the right-hand terminal J and the junction of the resistors $R_3$ and $R_4$, the junction of resistors $R_3$ and $R_4$ being connected to the anode of a diode $B_4$, and positive pulses being applied to the cathode of the diode. These pulses may be the same as those applied to the terminal $K_2$ and may as shown be derived from the same source PG1. The channel pulses applied between terminals J are in such a sense as to make the right-hand terminal positive relatively to the left-hand terminal, and whenever a pulse occurs in a channel other than that which the circuit of Figure 10 is concerned, the diode $B_4$ conducts and prevents the application of voltage to the grid of the valve $V_3$. On the other hand when a pulse of the appropriate channel appears between the terminals a positive pulse is simultaneously applied to the cathode of the diode, and the diode is thus arranged to be rendered insulating and to permit voltage to be transferred to the capacitance C. Further sections, each comprising a series resistor such as $R_{10}$ and a shunt diode such as $B_5$, may be added in cascade with that described between the right hand terminal J and the junction of the resistors $R_3$ and $R_4$, the same pulses being applied to the cathodes of all such diodes.

It is, of course, not essential in carrying out the present invention that the leading edge P of the pulses in Figure 1 should be maintained with its original shape. Its steepness may be decreased without serious disadvantages.

Referring to Fig. 11, received pulse signals which may be multi-channel signals, are applied at J to the control grid of a valve $V_6$ having in its anode circuit a circuit LC resonant at a suitable frequency whose value will be referred to later. Each pulse which may have a form such as $P_1$ or $P_2$ in Fig. 12 (*a*) shock-excites the circuit LC to produce on the grid of a valve $V_7$ a voltage such as is shown in Fig. 12 (*b*). The valve $V_7$ is biased to be substantially unresponsive to voltages below the level Y. The peaks above this level cause current to flow in the valve $V_7$ and to charge the condenser C to a voltage dependent upon the amplitude of such peaks. It will be observed that the positive peaks at (*b*) in Fig. 12 are delayed in time relatively to the pulses $P_1$ and $P_2$ corresponding thereto at (*a*). The pulses $P_1$, $P_2$ are applied directly to the grid of a valve $V_8$ which is thereby rendered conducting and discharges the condenser C. Since the pulses $P_1$, $P_2$ occur in advance of the corresponding pulses applied to $V_7$, the condenser C is discharged just before each pulse of Fig. 12 (*b*) arrives to charge the condenser. The natural frequency of the circuit LC is chosen such that the desired delay is obtained. A resistance $R_{11}$ helps to keep constant the discharge anode current of $V_8$.

I claim:

1. In multi-channel pulse signalling, wherein recurrent trains of pulses modulated in respect of their energy content and located in different channels are interlaced in time with one another, and wherein the interval between successive pulses of each train is long compared with the duration of a pulse, a method of demodulating said pulses in a manner such as to increase the signal to noise ratio, said method comprising separating said trains from one another, then increasing the duration of each pulse of each train to extend over substantially the whole of the interval immediately following such pulse, which interval before said separation contained the pulses of other trains, the extension not being beyond the instant of occurrence of the next succeeding pulse of the same train, and subsequently applying each train of pulses of increased duration to a separate demodulator to extract the modulation from the trains.

2. In multi-pulse signalling, wherein recurrent trains of pulses modulated in respect of their energy content and located in different channels are interlaced in time with one another, and wherein the interval between successive pulses of each train is long compared with the duration of a pulse, an apparatus for demodulating said pulses in a manner such as to increase the signal to noise ratio, said apparatus comprising means for separating the trains from one another, means for increasing the duration of each pulse of each separated train by displacing the trailing edge thereof to a time close to but not after the leading edge of the next succeeding pulse of the same train, so as to extend said pulse over the time interval during which, before said separation, the pulses of other trains occurred, a plurality of demodulating devices, one for each channel, and means for applying each train, after increase in the duration of the pulses thereof, to a different one of said devices.

3. Apparatus according to claim 2 wherein said pulses are width-modulated, wherein said separating means comprises a cathode ray tube having a plurality of anodes, means to deflect the cathode ray beam of said tube in succession over a path adjacent said anodes, and means to apply said width-modulated pulses to deflect said beam over said anodes for the duration of said pulses, wherein said means for applying each train to a different demodulating device comprises a connection between each of said demodulating devices and one of said anodes, and wherein said means for increasing the duration of each pulse of each train comprises capacitance between said anode and a point of fixed potential, and a secondary electron emitting member connecting electrically to each said anode and positioned to be engaged by said beam immediately before engagement by said beam of the anode connected thereto, said secondary emitting electrode thereby discharging said capacitance immediately before the occurrence of the leading edge of each pulse.

4. In multi-channel pulse signalling, wherein recurrent trains of pulses modulated in respect of their energy content and located in different channels are interlaced in time with one another, and wherein the interval between successive pulses of each train is long compared with the duration of a pulse, an apparatus for demodulating said pulses in a manner such as to increase the signal to noise ratio, said apparatus comprising means for separating the trains from one another, a condenser for each of said separated trains, means to apply each separated train to its corresponding condenser to charge said condenser to voltages representative of the modulation of the pulses of the separated train, a separate demodulator coupled to each condenser to extract the modulation from the voltages on said condenser, and means to discharge each condenser not later than the instant of occurrence of the leading edge of the next succeeding pulse of the same train, whereby each pulse of each said train has its duration extended over a time interval which, before said separation, was occupied by pulses of other ones of said trains.

References Cited in the file of this patent

UNITED STATES PATENTS

| Number | Name | Date |
|---|---|---|
| 2,006,582 | Callahan et al. | July 2, 1935 |
| 2,404,307 | Whitaker | July 16, 1946 |
| 2,452,157 | Sears | Oct. 26, 1948 |
| 2,477,008 | Rosen | July 26, 1949 |
| 2,480,130 | Grieg | Aug. 30, 1949 |
| 2,487,522 | Candeland et al. | Nov. 8, 1949 |
| 2,500,574 | Rudenberg | Mar. 14, 1950 |
| 2,524,776 | Deloraine | Oct. 10, 1950 |
| 2,568,213 | Bath | Sept. 18, 1951 |
| 2,579,071 | Hansell | Dec. 18, 1951 |
| 2,580,421 | Guanella | Jan. 1, 1952 |